(12) United States Patent
Sun et al.

(10) Patent No.: US 11,663,486 B2
(45) Date of Patent: May 30, 2023

(54) INTELLIGENT LEARNING SYSTEM WITH NOISY LABEL DATA

(71) Applicant: INTERNATIONAL BUSINESS MACHINES CORPORATION, Armonk, NY (US)

(72) Inventors: Yang Sun, San Jose, CA (US); Abhishek Kolagunda, San Jose, CA (US); Xiaolong Wang, San Jose, CA (US); Steven Nicholas Eliuk, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 16/946,465

(22) Filed: Jun. 23, 2020

(65) Prior Publication Data

US 2021/0397895 A1 Dec. 23, 2021

(51) Int. Cl.
| | | |
|---|---|---|
| *G06F 16/00* | (2019.01) | |
| *G06N 3/084* | (2023.01) | |
| *G06F 17/18* | (2006.01) | |
| *G06N 20/00* | (2019.01) | |
| *G06N 3/088* | (2023.01) | |
| *G06F 18/214* | (2023.01) | |
| *G06F 18/2113* | (2023.01) | |

(52) U.S. Cl.
CPC .............. *G06N 3/084* (2013.01); *G06F 17/18* (2013.01); *G06F 18/2113* (2023.01); *G06F 18/2155* (2023.01); *G06N 3/088* (2013.01); *G06N 20/00* (2019.01)

(58) Field of Classification Search
CPC ...... G06K 9/6259; G06K 9/623; G06F 17/18; G06N 3/084; G06N 3/088; G06N 20/00; G06N 3/0454
See application file for complete search history.

(56) References Cited

U.S. PATENT DOCUMENTS

| | | | |
|---|---|---|---|
| 11,037,053 B2* | 6/2021 | Moon | G06N 3/0454 |
| 2018/0137405 A1* | 5/2018 | Moon | G06N 3/08 |
| 2018/0300576 A1 | 10/2018 | Dalyac et al. | |
| 2019/0205733 A1* | 7/2019 | Ghaeini | G06K 9/6267 |
| 2019/0354853 A1* | 11/2019 | Zoldi | G06N 3/08 |
| 2020/0272854 A1* | 8/2020 | Caesar | G06K 9/623 |

(Continued)

FOREIGN PATENT DOCUMENTS

CN 103150454 B 6/2015

OTHER PUBLICATIONS

Yao et al, "Deep Learning From Noisy Image Labels With Quality Embedding", IEEE, vol. 28, No. 4, Apr. 2019 , pp. 1909-1922 (Year: 2019).*

(Continued)

*Primary Examiner* — Jared M Bibbee
(74) *Attorney, Agent, or Firm* — Griffiths & Seaton PLLC

(57) ABSTRACT

Various embodiments are provided for providing machine learning with noisy label data in a computing environment using one or more processors in a computing system. A label corruption probability of noisy labels may be estimated for selected data from a dataset using temporal inconsistency in a machine model prediction during a training operation in a neural network.

17 Claims, 9 Drawing Sheets

(56) References Cited

U.S. PATENT DOCUMENTS

2021/0357776 A1* 11/2021 Quader .................. G06N 5/04

OTHER PUBLICATIONS

Choi, S., Hong, S., & Lim, S. (2018). "ChoiceNet: robust learning by revealing output correlations". arXiv preprint arXiv:1805.06431. (19 Pages).

Reed, S., Lee, H., Anguelov, D., Szegedy, C., Erhan, D., & Rabinovich, A. (2014). "Training deep neural networks on noisy labels with bootstrapping". arXiv preprint arXiv:1412.6596. (11 Pages).

Sukhbaatar, S., & Fergus, R. (2014). "Learning from noisy labels with deep neural networks". arXiv preprint arXiv:1406.2080, 2(3), 4. (10 Pages).

Xiao, T., Xia, T., Yang, Y., Huang, C., & Wang, X. (2015). "Learning from massive noisy labeled data for image classification". In Proceedings of the IEEE conference on computer vision and pattern recognition (pp. 2691-2699).(9 Pages).

Han, B., Yao, J., Niu, G., Zhou, M., Tsang, I., Zhang, Y., & Sugiyama, M. (2018). "Masking: A new perspective of noisy supervision". In Advances in Neural Information Processing Systems (pp. 5836-5846). (11 Pages).

Li, Y., Liu, L., & Tan, R. T. (2019). "Certainty-Driven Consistency Loss for Semi-supervised Learning". arXiv preprint arXiv:1901.05657. (10 Pages).

Patrini, G., Rozza, A., Krishna Menon, A., Nock, R., & Qu, L. (2017). "Making deep neural networks robust to label noise: A loss correction approach". In Proceedings of the IEEE Conference on Computer Vision and Pattern Recognition (pp. 1944-1952). (9 Pages).

* cited by examiner

Algorithm 1: UMN Operation while *Traning()* do

1. Sample a minibatch $B$ from training dataset $S$;

2. Apply Variational Auto-encoder model M1 to encode the data $x^i \in B$ to derive an encoder $q_\phi(z_a^i|x^i)$. ;

4. for *all data* $x^i \in B$: do

(i) Draw $z_a^i$ from the distribution $q_\phi(z_a^i|x^i)$ given $x^i \in S$;

(ii) Calculate $y_i$ based on our classifier model $q_\phi^b(y_i|z_a^i)$ (*Learner*).;

(iii) Maintain a moving average of the model weights for $q_\phi^b(y_i|z_a^i)$ (*Guider*). ;

(iv) Calculate $x_i$ based on the decoder $p_\theta(x_i|z_i^a)$. ;

end

5. Apply the conditional Variational Auto-encoder model M2 to encode the data $z_a^i \in B$ to derive an encoder $q_\phi(z_b^i|z_a^i, y_i)$. ;

6. Draw $z_b^i$ from the distribution $q_\phi(z_b^i|z_a^i, y_i)$ and compute the generative process $p_\theta(z_a^i|z_b^i, y_i)$ ;

7. for *all labeled data* $x_L^i \in B$: do

(i) Compute the label uncertainty $\epsilon$ based on the L1 difference between *Learner* and *Guider* ;

(ii) Compute the observed label distribution $\hat{y}_i \sim p_\theta(\hat{y}_i|y, z_a^i)$ based on the uncertainty $\epsilon$ end

8. Compute loss function $\mathcal{L}$ as a sum of the loss function of M1 and M2. ;

9. Compute the gradient $g_\theta = \frac{\partial \mathcal{L}}{\partial \theta}$; $g_\phi = \frac{\partial \mathcal{L}}{\partial \phi}$ ;

$\theta = \theta$ - AdamUpdate($\theta$);   $\phi = \phi$ - AdamUpdate($\phi$);

10. For $\phi$ in classifier $y_i \sim q_\phi^b(y_i|x_i)$, maintain Polyak's moving average for the guider as $\phi_G(t) = (1-\alpha)\phi_G(t-1) + \alpha * \phi_L(t)$ end

FIG. 7

INTELLIGENT LEARNING SYSTEM WITH NOISY LABEL DATA

BACKGROUND OF THE INVENTION

Field of the Invention

The present invention relates in general to computing systems, and more particularly to, various embodiments for providing an intelligent learning system with noisy label data in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for providing machine learning with noisy label data in a computing environment using one or more processors in a computing system, are provided. In one embodiment, by way of example only, a method for providing an intelligent machine learning training service (e.g., a neural network training service) with noisy label data in a computing system, again by a processor, is provided. A label corruption probability of noisy labels may be estimated for selected data from a dataset using temporal inconsistency in a machine model prediction during a training operation in a neural network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a diagram depicting exemplary pseudocode for providing an machine learning training service with noisy label data in a computing environment in a computing environment by a processor in which aspects of the present invention may be realized;

DETAILED DESCRIPTION OF THE DRAWINGS

Figure 1:
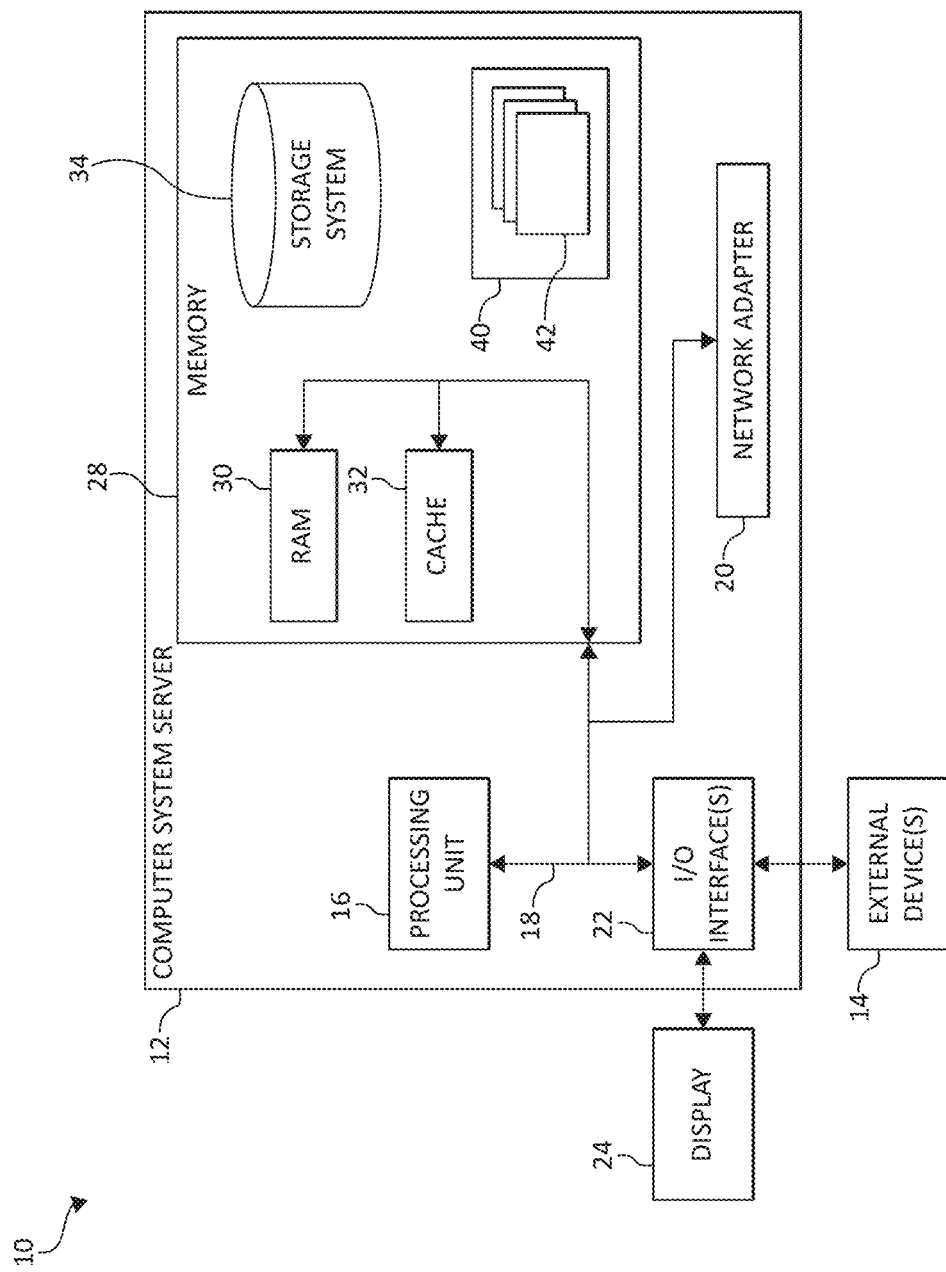
FIG. 1 is a block diagram depicting an exemplary cloud computing node according to an embodiment of the present invention.

The present invention relates generally to the field of artificial intelligence ("AI") such as, for example, machine learning and/or deep learning. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

To learn powerful representations, deep neural networks may require a large amount of training data. However, for many real world problems, it is not always possible to obtain sufficiently large, cleanly labeled datasets. Instead, a set of labeled training data that is limited in size and possibly with corrupted labels is used as training data, which may negatively affect a machine learning model performance. Although acquiring a large dataset is not difficult, accurate labeling of the data is expensive and an error-prone task requiring involvement of human interaction, especially using domain experts with knowledge in the specific field. Most of the time, deep learning (DL) models are built using limited training data along with corrupted data labels. It becomes very challenging to apply current popular deep learning frameworks to solve this problem. Training a deep learning model using noisy labeled data is a challenging task and current methods of training the deep learning model with noisy labels require large amount of labeled data as a prerequisite and are likely to overfit on the limited labeled training data with corrupted labels.

At the same time, current semi-supervised learning methods are unable to be directly applied due to the label noise. Unfortunately, there are solutions for solving the problem of training on limited annotated data with label noise or, said differently, training a DNN using small mislabeled datasets accompanied with large amount of unlabeled data.

Accordingly, mechanisms of the illustrated embodiments provide a framework to address these problems simultaneously and solves the challenge of training deep neural network on partially labeled data with label noise. In one aspect, the present invention provides an end-to-end deep generative pipeline for improving classifier performance when dealing with such data problems using an Uncertainty Mining Net ("UMN" or UMN operation). During a training stage, all the available data (e.g., labeled and unlabeled) may be used to train a classifier via a semi-supervised generative framework. During the training, the UMN may estimate the uncertainly of the labels' to focus on clean data for learning. More precisely, the UMN applies a sample-wise label uncertainty estimation operation. Thus, the UMN may reduce the effects of label noise and significantly improve classifier performance.

In an additional aspect, the UMN (e.g., an end-to-end system) may include, by way of example, only, at least two components. The first component of the UMN may be used to learn a latent feature representation via a generative framework (e.g., variational autoencoder "VAE"), using all the training data. Then the learned embedding is applied as input to its subsequent semi-supervised learning component by conditional VAE to train the classifier. To handle and process the label noise, a label uncertainty estimation component (e.g., a second component) may be used where reliable data (e.g., non-label noise data) contributes more to machine learning model training and noisy data contributes less.

In one aspect, the present invention provides for a new framework of semi-supervised learning with limited noisy labeled data. Through the integration of a deep generative model and an iterative averaging model, sample-wise label noise may be modeled through probabilistic modeling without any prior knowledge of the label corruption rate and a variational inference operation is developed to jointly optimize the generative model and classification model in an end-to-end framework (e.g., the UMN). The generative model may be validated by presenting improved experimental results on benchmark datasets as well as theoretical analysis and quantitatively our generative semi-supervised model may learn to identify sample-wise label noise.

In an additional aspect, mechanisms of the illustrated embodiments provide a novel solution to learn a more accurate machine learning model (e.g., an optimized machine learning model) on partially labeled data with label noise. First, an unsupervised learning scheme may be applied to learn a latent feature representation using all available training data. Then, the mechanisms of the illustrated embodiments may use the labels with semi-supervised learning pipeline to train a classifier. Second, the label uncertainty estimation may be used/incorporated to reduce the influences from mislabeled data. The label uncertainty of a given sample may be estimated from the prediction of the learning model and a guider model (e.g., an exponential moving average of the learning model or "iterative model").

The estimated uncertainty is then used to assign weights to the training data samples. This is an end-to-end framework, which is the UNM system.

Thus, one or more aspects of the present invention provide for an intelligent machine learning training service (e.g., a neural network training service) with noisy label data in a computing system. A label corruption probability of noisy labels may be estimated for selected data from a dataset using temporal inconsistency in a machine model prediction during a training operation in a neural network.

Also, it should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
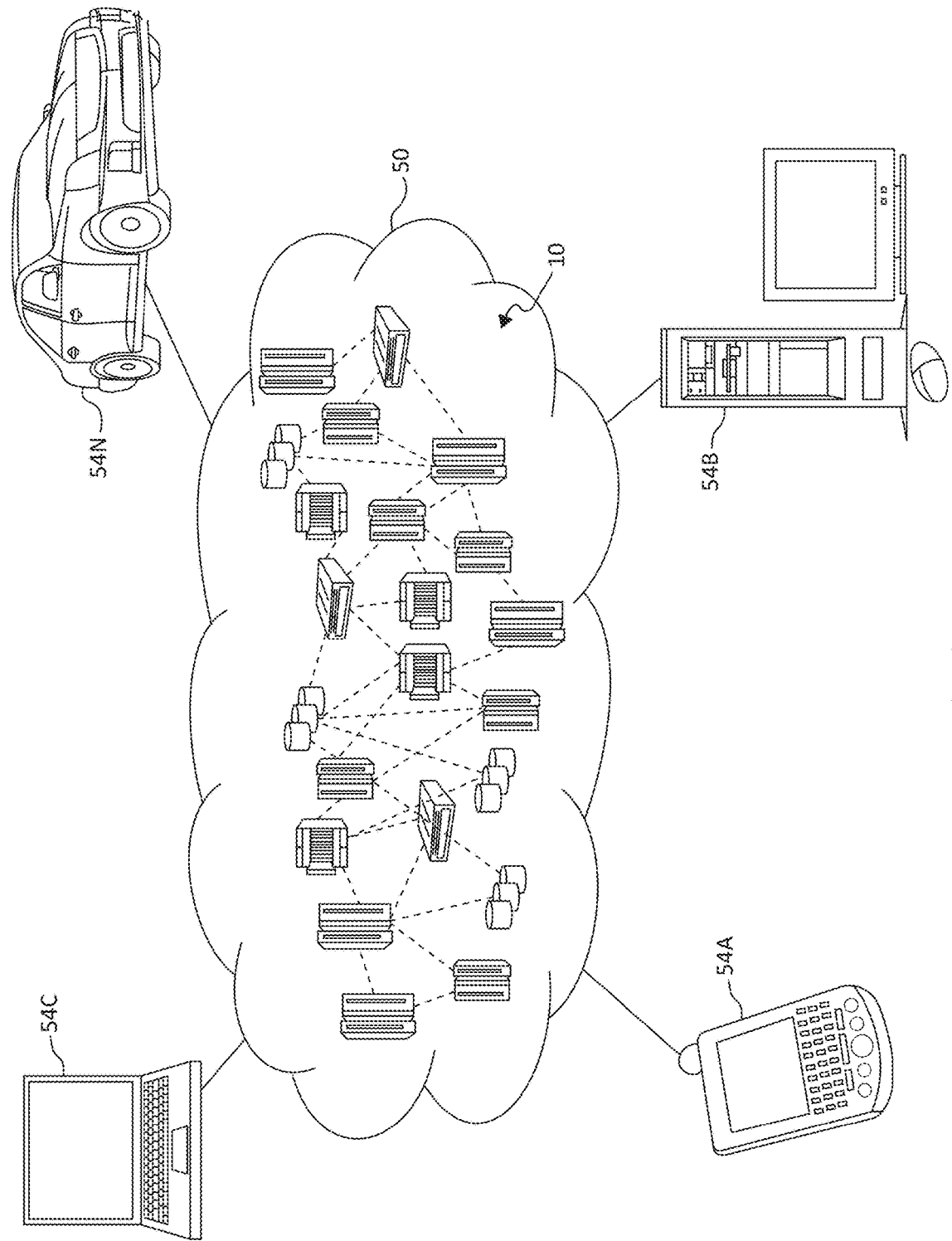
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
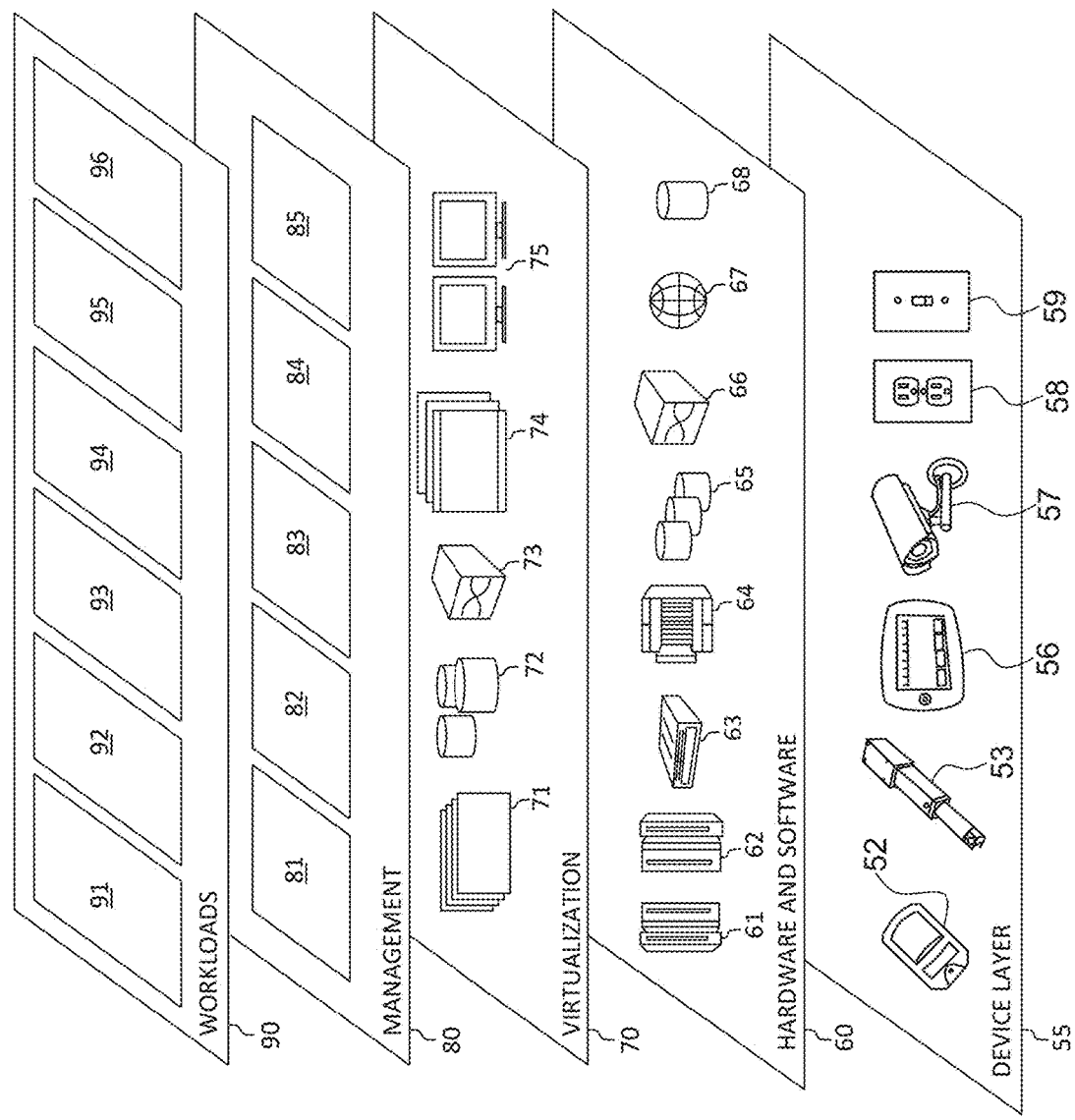
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automating decision making for a neural architecture search in a computing environment (e.g., in a neural network architecture). In addition, workloads and functions 96 for automating decision making for a neural architecture search in a computing environment may include such operations as analytics, deep learning, and as will be further described, user and device management functions. One of ordinary skill in the art will appreciate that the workloads and functions 96 for automating decision making for a neural architecture search in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing automating decision making for a neural architecture search in a computing environment in a computing system. One or more hardened machine learning models that are secured against adversarial challenges are provided by applying one or more of a plurality of combinations of selected preprocessing operations from one or more machine learning models, a data set used for hardening the one or more machine learning models, a list of preprocessors, and a selected number of learners.

Figure 4:
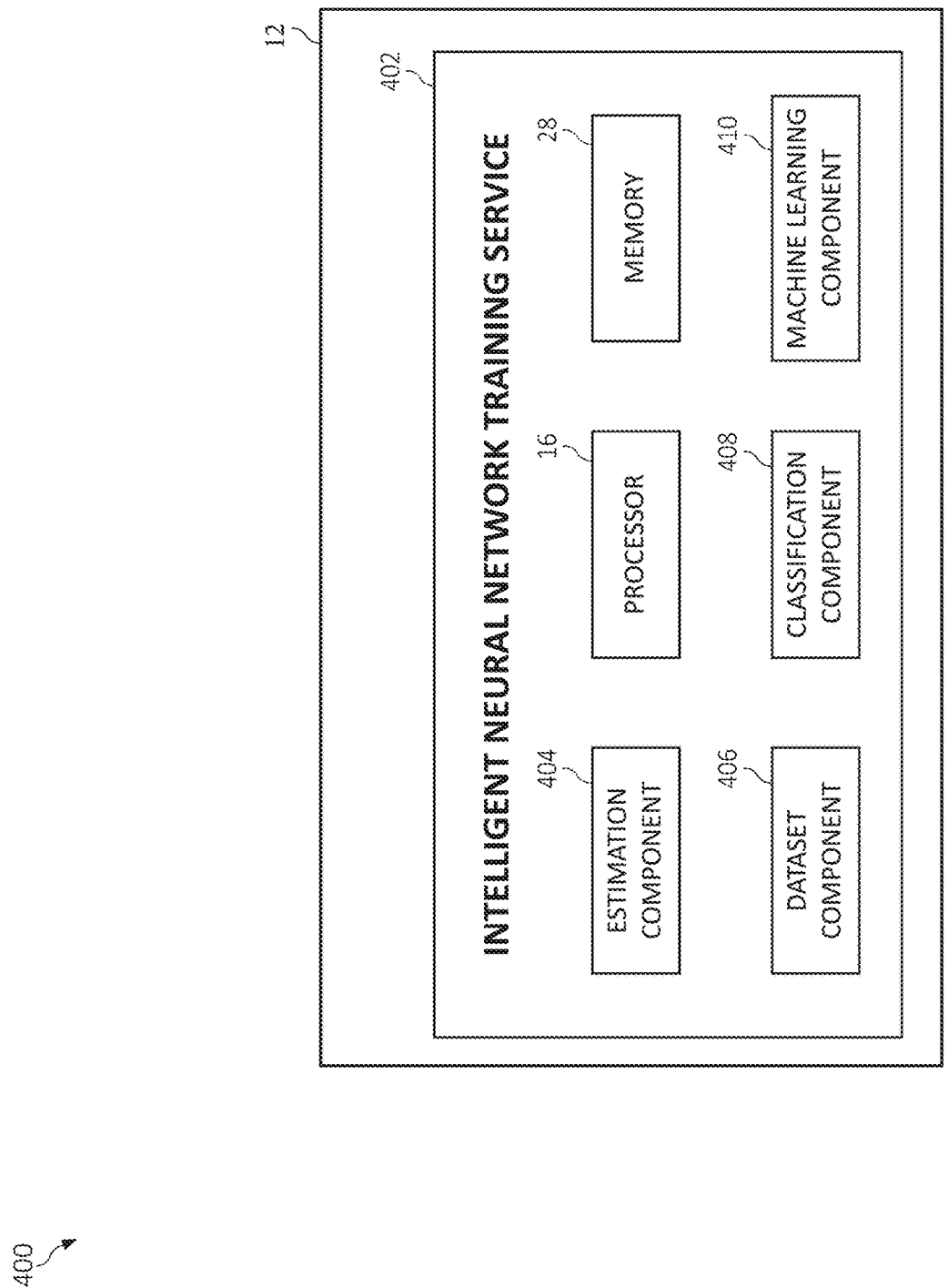
FIG. 4 is an additional block diagram depicting an exemplary functional relationship between various aspects of the present invention.

Turning now to FIG. 4, a block diagram depicting exemplary functional components of system 400 for providing an intelligent machine learning training service (e.g., a neural network training service) with noisy label data according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An intelligent neural network training service 402 is shown, incorporating processing unit 16 ("processors") and memory 28 of FIG. 1 to perform various computational, data processing and other functionality in accordance with various aspects of the present invention. The intelligent neural network training service 402 may be provided by the computer system/server 12 of FIG. 1. The intelligent neural network training service 402 may be provided by the computer system/server 12 of FIG. 1. The intelligent neural network training service 402 may include an estimation component 404, a dataset component 406, a classification component 408, and a machine learning component 410 (e.g., machine learning model component).

As one of ordinary skill in the art will appreciate, the depiction of the various functional units in the intelligent neural network training service 402 is for purposes of illustration, as the functional units may be located within or external to the computer system/server 12 of FIG. 1 or elsewhere within and/or between distributed computing components.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the intelligent neural network training service 402, in association with the estimation component 404, the dataset component 406, the classification component 408, and/or the machine learning component 410 if necessary, may estimate a label corruption probability of noisy labels for selected data from a dataset using temporal inconsistency in a machine model prediction during a training operation in a neural network.

The intelligent neural network training service 402, in association with the estimation component 404, the dataset component 406, the classification component 408, and/or the machine learning component 410 if necessary, may use a semi-supervised training operation via a machine learning operation for estimating the label corruption probability of noisy labels for the selected data, wherein the semi-supervised training operation assumes a categorical label corruption rate for the selected data.

The machine learning component 410 may learn the label corruption probability of noisy labels for the selected data from the dataset using a machine learning operation. The dataset may a labeled dataset, an unlabeled dataset, a mislabeled dataset, or combination thereof.

The estimation component 404 may predict the label corruption probability according to a difference between a moving average model and a machine learning model to modulate a labeled classification loss for processing the dataset having noisy labels.

The machine learning component 410, in association with the classification component 408, may use an unsupervised learning operation to learn one or more latent feature representations from a training dataset and utilize labeled and unlabeled data for training a classifier via semi-supervised learning operation.

The machine learning component 410, in association with the classification component 408, may apply the label corruption probability into a classifier to reduce a negative impact of mislabeled data in the selected dataset.

The intelligent neural network training service 402, in association with the estimation component 404, the dataset component 406, the classification component 408, and/or the machine learning component 410 if necessary, may use the label corruption probability of noisy labels to assign one or more weights to the selected data.

In one aspect, the machine learning component 410, as described herein, may be perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the intelligent neural network training service 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
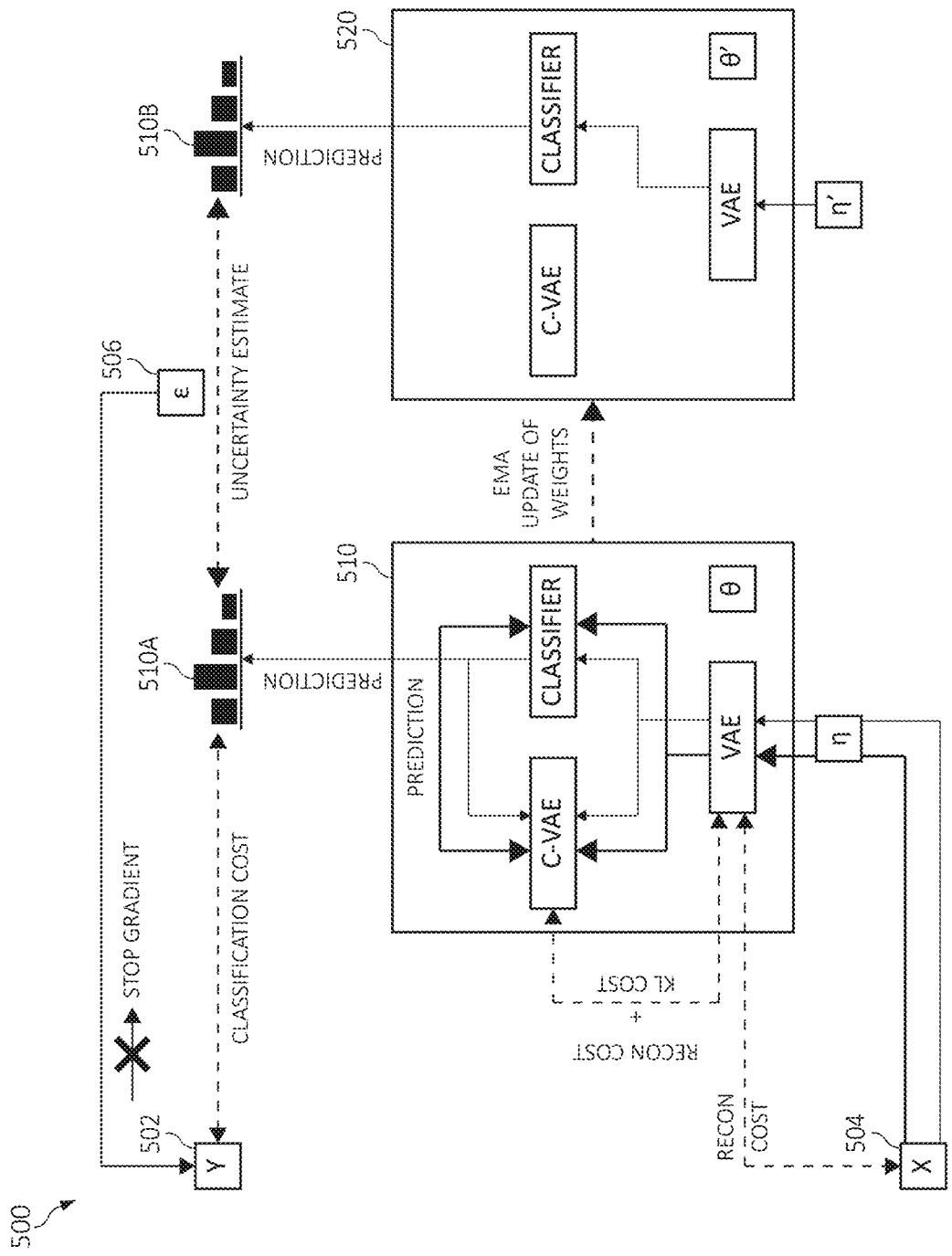
FIG. 5 is a block diagram depicting exemplary an system and functionality for providing an machine learning training service with noisy label data in a computing environment in a computing environment by a processor in which aspects of the present invention may be realized.

Turning now to FIG. 5, a block diagram depicts exemplary an system 500 and functionality for providing an machine learning training service with noisy label data in a computing environment in a computing environment. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-4. Repetitive description of like elements employed in other embodiments described herein is omitted for sake of brevity.

As shown, the various blocks of functionality of system 500 are depicted with arrows designating the blocks' 500 relationships with each other and to show process flow. Additionally, descriptive information is also seen relating each of the functional blocks of system 500. As will be seen, many of the functional blocks of system 500 may also be considered "modules" or "components of functionality, in the same descriptive sense as has been previously described in FIGS. 1-4. With the foregoing in mind, the module blocks 500 may also be incorporated into various hardware and software components of a UMN system in accordance with the present invention. Many of the functional blocks 500 may execute as background processes on various components, either in distributed computing components, or on the user device, or elsewhere.

In one aspect, system 500 is a an UMN framework where X (at block 504) and Y (at block 502) are the observed inputs and potentially corrupt labels, $\theta$ and $\theta'$ are semi-supervised generative models (e.g., semi-supervised generative model $\theta$ at block 510 and semi-supervised generative model $\theta'$ at block 520), $\eta$ and $\eta'$ are noise functions that perturb the input X. The thick line and thin arrows represent the flow of unlabeled and labeled data through the models. The semi-supervised generative model $\theta$ is updated via a stochastic gradient descent approach so as to minimize the classification and VAE losses. The semi-supervised generative model $\theta'$ is an exponential moving average ("EMA") of the semi-supervised generative model $\theta$.

The sample-wise uncertainty ($\epsilon$), at block 506, between the predictions (at blocks 510A and 510B) of the semi-supervised generative models $\theta$ and $\theta'$ are used to reweigh the gradients that are back propagated to the semi-supervised generative model $\theta$ via the classification loss. Also, the variational autoencoder ("VAE") indicates the VAE and C-VAE represents a conditional-VAE. It should be noted that in the semi-supervised generative model $\theta$, when making predictions (on labeled data), only the weights from encoder of the VAE and the classifier are used.

Latent-Feature Learning

In one aspect, a given data as the set of X, Y may be represented as follows:

$$(X,Y)=\{(X_1,Y_1), \ldots, (X_N,Y_N)\}, \quad (1)$$

where $x_i$ is the observed data sample and $y_i$ is its corresponding label which may be potentially corrupted. If $x_i$ is unlabeled, then $y_i$ becomes empty. (To be concise, as used herein, the index i may be omitted for illustrative convenience). Using one or more generative models in semi-supervised learning related applications, first, the variational autoencoder (VAE) may be applied on all the training data. In one aspect, the VAE may include 1) an encoder that maps the variables x to the latent variables z to approximate the prior distribution of p(z) and 2) a generator $p_\theta(x|z)$ that samples the input variables x given the latent variables z, which be formulated as:

$$p(z)=\mathcal{N}(z|0,I), p_\theta((x|z)=f(x;z,\theta), \quad (2)$$

where f(x; z, $\theta$) is the likelihood function parameterized by a deep neural network with the semi-supervised generative model $\theta$'s as network parameters (decoder), and $\mathcal{N}$ indicates the Gaussian distribution.

The objective of VAE is the evidence lower bound ("ELBO") of $p_\theta(x)$ given as:

$$\log p_\theta(x) \geq \mathbb{E}_{q_\phi(z|x)} \log p_\theta(z|x) - D_{KL}(q_\phi(z|x) \| p(x)), \quad (3)$$

where $q_\phi$ is the posterior approximation parameterized by a deep neural network (encoder), $D_{KL}$ is a kullback-leibler divergence for two probability distribution (e.g., the right hand side of the equation may refer to the divergence between q and p), and $\mathbb{E}$ means the expectation of X. The learned latent variables obtained from the VAE can be used as the feature representation to train the classifier. Based on this, the knowledge from the training data may be fully utilized without the constraint of the labeled data size. The low dimensional embedding z can cover (e.g., a representation of") the distribution of the input data x.

It should be noted, by way of example only, an assumption may be made that the unlabeled data helps robustly training against the noisy labels via the deep generative modeling, as demonstrating in semi-supervised learning discuss below.

Semi-Supervised Learning

After building the unsupervised learning framework via the VAE (e.g., a latent embedding learning module is built to learn latent embedding via VAE, a semi-supervised learning model may be built on top of the latent embedding learning module using a conditional VAE. That is, latent embedding learning module refers to the VAE to learn the embedding (or low-dimensional representation) of the data and the label information may be applied to improve learning capability of the neural network. In addition to the latent feature embedding module, a true class label may be considered as a latent variable. The generative process, for a conditional generative model, can then be formulated as:

$$y, z_b \sim M(y), p(z_b), z_a \sim p_\theta(z_a|z_b, y), \quad (4),$$

$$x \sim p_\theta(x|z_a), \hat{y} \sim p_\theta(\hat{y}|y, z_a), \quad (5),$$

where M is the multinomial distribution, y indicates the true label, $z_a$ is jointly generated from $z_b$ and y, and $z_b$ is the latent representation of the input. Thus, the latent vector $z_a$ may directly be used, which is obtained from the VAE of latent-feature learning operation along with pre-defined labels. To more accurately capture the reliability of labels, label uncertainty for each sample may be estimated via $p_\theta(\hat{y}|y, z_a)$. The term $p(\hat{y}|y, z_a)$ suggests the likelihood of an observed label $\hat{y}$ being correct given the hidden label y (e.g., the true label) and the sample itself. Therefore, for the dataset with simulated noisy labels, the data labels may be randomly corrupted and estimate this term (e.g., $p(\hat{y}|y, z_a)$), for all the samples without loss of generality.

The posterior distribution of the combined VAE and C-VAE structure/architecture can then be factorized as:

$$q(z_a, z_b, y|x, \hat{y}) = q(z_a|x) q(y|z_a) q(z_b|z_a, y), \quad (6).$$

Following this, the evidence lower bound ("ELBO") can be derived as follows (e.g., equation 7):

$$-\sum_{x \in \{L,U\}} \mathbb{E}_{q_\phi(z_a|x)} \sum_{y \in C} q_\phi(y|z_a) KL(q\phi(z_b|z_a, y)\|p(z_b)) - \quad (7),$$

$$\sum_{x \in \{L,U\}} \mathbb{E}_{q_\phi(z_a|x)} \sum_{y \in C} q_\phi(y|z_a) KL(q\phi(y|z_a, y)\|p(y)) - \sum_{x \in \{L,U\}} \mathbb{E}_{q_\phi(z_a|x)}$$

$$\sum_{y \in C} q_\phi(y|z_a) \mathbb{E}_{q_\phi(z_b|z_a, y)}(\log p_\theta(z_a|z_b, y) - \log q_\phi(z_a|x)) +$$

$$\sum_{x \in \{L,U\}} \mathbb{E}_{q_\phi(z_a|x)} \log p_\theta(x|z_a) +$$

$$\sum_{x \in \{L\}} \mathbb{E}_{q_\phi(z_a|x)} \sum_{y_k \in C} q_\phi(y_k|z_a) \log p_\theta(\hat{y}|y_k, z_a),$$

where $q_\phi(y|z_a)$, $q_\phi(z_a|x)$, $q_\phi(z_b|z_a, y)$, $p_\theta(z_a|z_b, y)$, and $p_\theta(x|z_a)$ indicate the classifier (e.g., $q_\phi(y|z)$, encoder (e.g., $q_\phi(z_a|x)$, conditional encoder (e.g., $q_\phi(z_b|z_a, y)$), conditional decoder (e.g., $p_\theta(z_a|z_b, y)$), and decoder functions (e.g., $p_\theta(x|z_a)$) respectively and each are modeled using deep neural networks. Also, L indicates labeled data, U means unlabeled data, and C denotes the set of used classes, and the last term (of equation 7 such as, for example, $\sum_{x \in \{L\}} \mathbb{E}_{q_\phi(z_a|x)} \sum_{y_k \in C} q_\phi(y_k|z_a) \log p_\theta(y|y_k, z_a)$ can be seen as the labeled loss term and thus as the supervised portion of the objective (e.g., equation 7). Thus, the "classification cost" refers to the supervised learning loss in the semi-supervised learning loss, which is the last term in equation 7.

Figure 6:
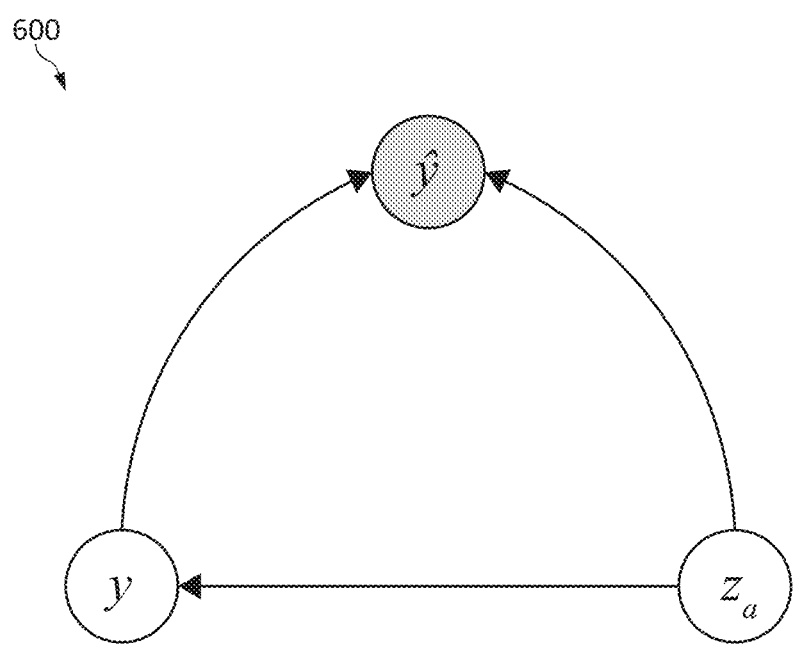
FIG. 6 is a diagram depicting exemplary graphical model generating an observed label in a computing environment by a processor in which aspects of the present invention may be realized.

As indicated in equation 7, except the last term, all other terms in the equation are calculated over all training data samples. The last term serves as the supervised factor for semi-supervised learning where the observed labels may be incorrect. The last term uses an uncertainty related function $p_\theta(\hat{y}|y_k, z_a)$, to modulate the sample weights during the gradient back-propagation. That is, all the terms except for the last one sum over the all the samples and the last term serves as a supervised for the semi-supervised learning. It uses an uncertainty related function to modulate the gradient backpropagation. The generative process 600 for observed $\hat{y}$ is shown in the FIG. 6, which is a graphical model generating the observed label. It should be noted that the arrows for y, $\hat{y}$, and $z_1$ denote a generative process (e.g., probabilistic arrows means conditional dependence such as, for example, where "z→y" means z depends on y).

As illustrated in FIG. 5, the sample-wise uncertainty ("$\epsilon$", at block 506) may be used to approximate $p_\theta(\hat{y}|y_k, z_a)$. One plausible way to estimate the uncertainty of the sample label is to reduce $p(\hat{y}|y_k, z_a)$ to model class conditional corruption ratio $p(\hat{y}|y)$, which is a mean field approximation for the uncertainty, as:

$$p(\hat{y}|y) = \begin{cases} 1 - \epsilon, & \text{if } \hat{y} = y \\ \epsilon/(C-1), & \text{otherwise} \end{cases}. \quad (8)$$

Hence the labeled loss term can be formulated as the following equation:

$$\mathbb{E}_{q_\phi(z_a|x)}[f(\epsilon) q_\phi(y|z_a)] \quad (9),$$

where $$f(\epsilon) \log\left[\frac{(C-1)(1-\epsilon)}{\epsilon}\right]$$

is a function with class conditional constant $\epsilon$ (e.g., the sample-wise uncertainty at block 506 of FIG. 5). From equation 9, it is observed that this results in assigning the same weight for all samples belonging to a category (e.g., all labeled terms) contribute equally to the gradient back propagated regardless of their label correctness as illustrated in the following equation:

$$\mathbb{E}_{q_\phi(z_a|x)}[f(\epsilon) \nabla_\phi q_\phi(y|z_a)], \quad (10).$$

However, such an assumption (for assigning the same weight for all samples belonging to a category) may not hold in real scenarios. The "assumption" may be the assumption from equation 9 where assigning the same weight for all samples belonging to a category (e.g., all labeled terms) contribute equally to the gradient back propagated regardless of their label correctness. In general, the value of the class conditional corruption rate $\epsilon$, remains unknown beforehand. Also, it may not be accurate to apply the same categorical corruption ratio to all data samples of a given class. Thus, the present invention solves these problems by estimating a sample-wise uncertainty during the training stage. Accordingly, the class conditional constant in equation 10 may be replaced with a point-wise estimation of the label uncertainty $\epsilon(z_a)$, where the generative process of equation 5. The label uncertainty is hence $\epsilon(z_a)$). The pointwise label uncertainty is calculated as:

$$p(\hat{y} | y, z_a) = \begin{cases} 1 - \epsilon(z_a), & \text{if } y = y \\ \epsilon(z_a)/(C-1), & \text{otherwise} \end{cases} \quad (11)$$

Thus, f(ε) in equation 10 becomes:

$$f(\epsilon) = \log\left[\frac{(C-1)(1-\epsilon(z_a))}{\epsilon(z_a)}\right], \quad (12).$$

That is, samples contribute relatively more to the gradient backpropagation when the estimated ε is small, which indicates there is a high probability that the given label is correct. By focusing on these reliable targets during training, a more robust classifier may be trained. Thus, it may be observed that the key is to precisely approximate the label uncertainty $\epsilon(z_a)$.

It should be noted that the UMN system 500 is flexible and, depending on the task, the encoder and decoder of the UMN system 500 may be implemented using various deep learning networks. Also, the UMN system 500 is not limited to image classification and may be easily extended to other classification problems.

Uncertainty Estimation

It should be noted that the object of the present invention is to train a more robust classifier in an end-to-end semi-supervised architecture (e.g., the UMN system 500 of FIG. 5) by estimating the label uncertainty $\epsilon(z_a)$ (e.g., sample-wise label noise) as this cannot be known a priori but the UMN system 500 may use the exponential moving average of the model weights to stabilize the training in stochastic gradient based approaches.

In one aspect, the exponential moving average of the model weights can be calculated as:

$$\theta'_t = \gamma \theta'_{t-1} + (1-\gamma)\theta_t, \quad (13)$$

where θ is the set of weight parameters of the classifier model (e.g., a learner), θ' is its exponential moving average (e.g., a guider), γ controls the smoothness of model updates (e.g., a classifier model such as, for example $q_\phi(y_k|z_a)$), and t is the step index of the iterative optimization. That is, the θ (e.g., the set of weight parameters of the classifier model) is the learner and θ' (e.g., the exponential moving average) is a "guider".

Since the iterate average gives optimal bound for convergence rate and can be less sensitive to the noisy updates of equation 13, the iterate average may be adopted/used as the guider model to estimate the label uncertainty. The label uncertainty may be approximated/estimated via the absolute difference in the predicted probability of the learner and the guider for the observed class as:

$$\in(z_a) = |q_L(y|z_a) - q_G(y|z_a)|, \quad (14).$$

As the learner learns from the noisy labeled data, the guider model is used to weigh the samples based on uncertainty thus limiting the contributions of unreliable samples to the gradients back propagated.

Also, the analysis of the reason why using the difference between the predictions of the guider and learner models is a good measure for the uncertainty estimation is now described.

Theoretical Analysis

In one aspect, a theorem which shows that the label correctness is associated with the difference between the Learner and Guider models during training, may be used. In a first theorem (e.g., theorem 1), assume that θ* is the optimal solution of the optimization problem. $\theta_L$ may be the stochastic random variable for stochastic gradient decent "SGD" (e.g., learner) and $\theta_G$ is iterate average (e.g., guider) of $\theta_L$. The $\theta_G T$ may be equal to $\mu_T$, which is equal to $$\frac{1}{T}\int_0^T \theta_L(t)dt.$$

The distance between $\theta_L$ and θ* is consistent with the distance between $\theta_L$ and $\theta_G$ in the sense that:

$$\mathbb{E}\left[\left(\frac{\partial}{\partial \theta_L}[\|\theta_L - \theta^*\|^2]\right)^T (\theta_L - \theta_G)\right] > 0, \quad (15),$$

which holds when the training epoch T satisfies the following relation:

$$T < \left(\frac{1}{\lambda}\right)(Tr\{\mathcal{H}^{-1}\Sigma\}/Tr\{\Sigma\}), \quad (16),$$

where λ is the constant learning rate, $\Sigma \propto \mathbb{E}(\theta(t)\theta^T(t))$ is the covariance of the stochastic process and $\mathcal{H}$ is the Hessian of the loss surface. It may be observed from equation 14, during the early training stage, the distance between the learner and the optimal solution increases when the distance between the learner and guider increases and vice versa. This leads to preventing samples with uncertain labels to participate in training and thus reducing the overfitting on potentially wrong labels. In summary, one or more operations described in FIGS. 5 and 6 may be illustrated in UMN operations 710 of the depicted pseudocode 700 of FIG. 7 for providing an machine learning training service with noisy label data.

It should be noted in FIG. 7 that in step 1, "B" means a mini-batch and "S" means a dataset. In step 2) M1 is the first VAE model (see FIG. 5). In step 3, $z_a^i$ is the latent distribution learnt from M1, in step 4 "$q_\phi(y_k|z_a)$" is the classifier model. In step 5, "$p_\theta(x_i|z_a)$" is the generative model (decoder of M1) that generates the raw data. In step 6, "$q_\phi(z_b|z_a,y)$" is the encoder of M2. In step 7, $\hat{y}^i \sim p\theta(\hat{y}^i|y,z_a^i)$ is the uncertainty term. In step 8, "g" represents the gradient and θ and φ are the model parameters.

Figure 8:
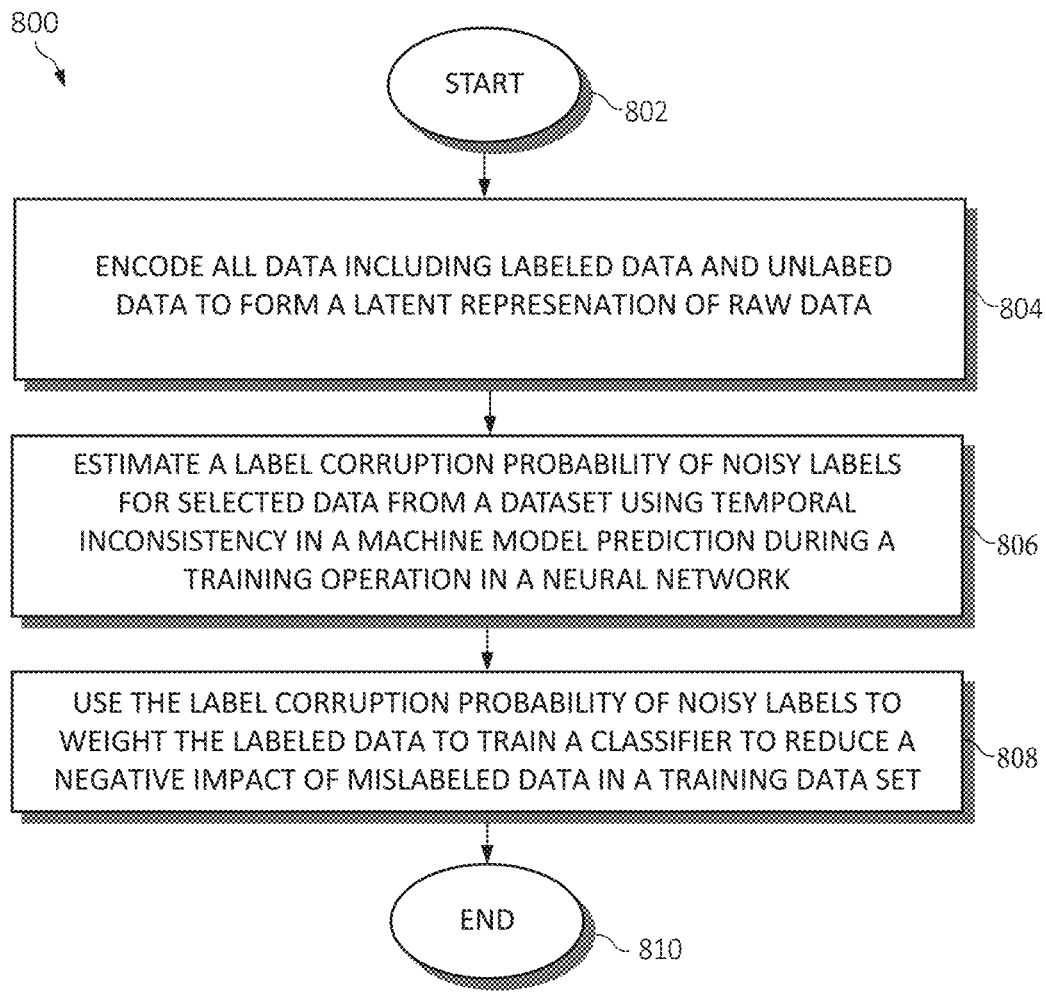
FIG. 8 is a flowchart diagram depicting an exemplary method for providing an intelligent machine learning training service with noisy label data in a computing environment by a processor, again, in which aspects of the present invention may be realized.

Turning now to FIG. 8, an additional method 800 for providing an intelligent machine learning training service with noisy label data in a computing environment using a processor is depicted. The functionality 800 may be implemented as a method executed as instructions on a machine, where the instructions are included on at least one computer readable medium or one non-transitory machine-readable storage medium. The functionality 800 may start in block 802.

All data including labeled and unlabeled data may be encoded to form a latent representation of raw data, as in block 804. A label corruption probability of noisy labels may be estimated for selected data from a dataset using temporal inconsistency in a machine model prediction during a training operation in a neural network, as in block 806. The label corruption probability of noisy labels may be used to weight the labeled data and train a classifier to reduce a negative impact of mislabeled data in a training data set, as in block 808. The functionality 800 may end, as in block 810.

In one aspect, in conjunction with and/or as part of at least one blocks of FIG. 8, the operations of 800 may include each of the following. The operations of 800 may use a semi-supervised training operation via a machine learning operation for estimating the label corruption probability of noisy labels for the selected data, wherein the semi-supervised training operation assumes a categorical label corruption rate for the selected data.

The operations of 800 may learn the label corruption probability of noisy labels for the selected data from the dataset using a machine learning operation, wherein the dataset is a labeled dataset, an unlabeled dataset, a mislabeled dataset, or combination thereof. The operations of 800 may predict the label corruption probability according to a difference between a moving average model and a machine learning model to modulate a labeled classification loss for processing the dataset having noisy labels.

The operations of 800 may use an unsupervised learning operation to learn one or more latent feature representations from a training dataset, and utilize labeled and unlabeled data for training a classifier via semi-supervised learning operation. The operations of 800 may apply the label corruption probability into a classifier to reduce a negative impact of mislabeled data in the selected dataset. The operations of 800 may use the label corruption probability of noisy labels to assign one or more weights to the selected data.

Figure 9:
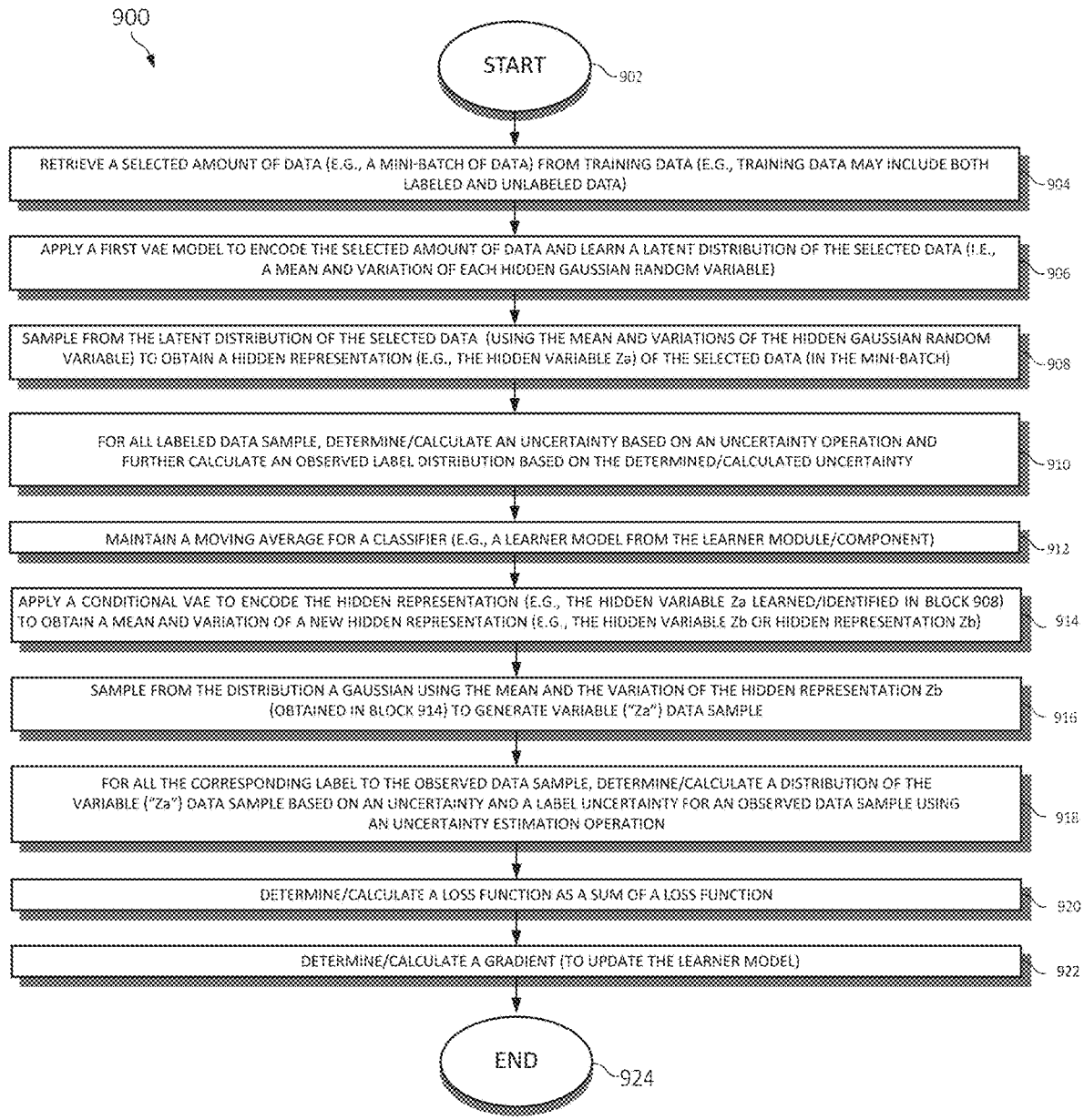
FIG. 9 is an additional flowchart diagram depicting an exemplary method for providing an intelligent machine learning training service with noisy label data in a computing environment by a processor, again, in which aspects of the present invention may be realized

Turning now to FIG. 9, an additional method 900 for providing an intelligent machine learning training service with noisy label data in a computing environment using a processor is depicted. The functionality 900 may be implemented as a method executed as instructions on a machine, where the instructions are included on at least one computer readable medium or one non-transitory machine-readable storage medium. The functionality 900 may start in block 902.

A selected amount of data (e.g., a mini-batch of data) may be retrieved from training data (e.g., training data that may include both labeled and unlabeled data), as in block 904.

A first VAE ("variational autoencoder) model may be applied to encode the selected amount of data and learn a latent distribution of the selected data (i.e., a mean and variation of each hidden Gaussian random variable), as in block 906.

The latent distribution of the selected data (e.g., hidden Gaussian random variables) may be sampled (using the mean and variations of the hidden Gaussian random variable) to obtain a hidden representation (e.g., the hidden variable $z_a$) of the selected data (in the mini-batch), as in block 908.

For all data in the selected data (in the mini-batch), a label of the data sample may be determined/calculated using a learning operation (e.g., using a learner module/component) and the hidden representation (e.g., the hidden variable $z_a$ learned/identified in block 908) and simultaneously generate raw data using a decoder, as in block 910. A moving average for a classifier (e.g., a learner model from the learner module/component) may be maintained, as in block 912. The classifier is the ultimate objective and the classifiers needs to be trained, which is not biased by incorrectly labeled data.

A conditional VAE may be applied to encode the hidden representation (e.g., the hidden variable $z_a$ learned/identified in block 908) to obtain a mean and variation of a new hidden representation (e.g., hidden variable $z_b$ or hidden representation $z_b$), as in block 914. Label information may also be determined/calculated using a learning operation (e.g., using a learner module/component).

A Gaussian may be sampled from the latent distribution of the selected data using the mean and the variation of the hidden representation $z_b$ (obtained in block 914) to generate variable ("$z_a$") data sample, as in block 916.

For all labeled observed sample, an uncertainty may be determined/calculated based on an uncertainty operation, and an observed label distribution may be determined/calculated based on the determined/calculated uncertainty, as in block 918.

A loss function (e.g., a final objected function to optimize) may be determined/calculated as a sum of a loss function of the first VAE and the conditional VAE, as in block 920. A gradient may be determined (to update the learner model and/or so that once a parameterized objected is determined, a back propagation may be performed), as in block 922. The functionality 900 may end, as in block 924.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing machine learning with noisy label data in a computing environment using one or more processors comprising:
   receiving a dataset containing labeled and unlabeled data;
   executing machine learning logic to train a neural network with the dataset in an unsupervised training operation by learning one or more latent feature representations via a variational autoencoder (VAE), wherein the training of the neural network further includes:
      retrieving a subset of the dataset as selected data,
      applying the VAE to encode the selected data and learn a latent distribution of the selected data,
      sampling the latent distribution to obtain a hidden representation of the selected data, wherein the hidden representation is used to determine a label for the selected data, and
      encoding the hidden representation by a conditional VAE to obtain a mean and variation of a new hidden representation; and
   estimating a label corruption probability of noisy labels for selected data from the dataset using temporal inconsistency in a machine model prediction during the training, wherein an embedding of the learned latent feature representation is applied as input to a semi-supervised training operation by the conditional VAE to perform the training of a classifier.

2. The method of claim 1, wherein the semi-supervised training operation assumes a categorical label corruption rate for the selected data.

3. The method of claim 1, further including automatically learning the label corruption probability of the noisy labels for the selected data from the dataset using a machine learning operation, wherein the dataset is a labeled dataset, an unlabeled dataset, a mislabeled dataset, or combination thereof.

4. The method of claim 1, further including predicting the label corruption probability according to a difference between a moving average model and a machine learning model to modulate a labeled classification loss for processing the dataset having the noisy labels.

5. The method of claim 1, further including applying the label corruption probability into the classifier to reduce a negative impact of mislabeled data in the selected dataset.

6. The method of claim 1, further including using the label corruption probability of the noisy labels to assign one or more weights to the selected data.

7. A system for providing machine learning with noisy label data in a computing environment, comprising:
   one or more computers with executable instructions that when executed cause the system to:
      receive a dataset containing labeled and unlabeled data;
      execute machine learning logic to train a neural network with the dataset in an unsupervised training operation by learning one or more latent feature representations via a variational autoencoder (VAE), wherein the training of the neural network further includes:
retrieving a subset of the dataset as selected data,
applying the VAE to encode the selected data and learn a latent distribution of the selected data,
sampling the latent distribution to obtain a hidden representation of the selected data, wherein the hidden representation is used to determine a label for the selected data, and
encoding the hidden representation by a conditional VAE to obtain a mean and variation of a new hidden representation; and
estimate a label corruption probability of noisy labels for selected data from the dataset using temporal inconsistency in a machine model prediction during the training, wherein an embedding of the learned latent feature representation is applied as input to a semi-supervised training operation by the conditional VAE to perform the training of a classifier.

8. The system of claim 7, wherein the semi-supervised training operation assumes a categorical label corruption rate for the selected data.

9. The system of claim 7, wherein the executable instructions when executed cause the system to learn the label corruption probability of the noisy labels for the selected data from the dataset using a machine learning operation, wherein the dataset is a labeled dataset, an unlabeled dataset, a mislabeled dataset, or combination thereof.

10. The system of claim 7, wherein the executable instructions when executed cause the system to predict the label corruption probability according to a difference between a moving average model and a machine learning model to modulate a labeled classification loss for processing the dataset having the noisy labels.

11. The system of claim 7, wherein the executable instructions when executed cause the system to apply the label corruption probability into the classifier to reduce a negative impact of mislabeled data in the selected dataset.

12. The system of claim 7, wherein the executable instructions when executed cause the system to use the label corruption probability of the noisy labels to assign one or more weights to the selected data.

13. A computer program product for, by a processor, providing machine learning with noisy label data in a computing environment, the computer program product comprising a non-transitory computer-readable storage medium having computer-readable program code portions stored therein, the computer-readable program code portions comprising:

an executable portion that receives a dataset containing labeled and unlabeled data;
an executable portion that executes machine learning logic to train a neural network with the dataset in an unsupervised training operation by learning one or more latent feature representations via a variational autoencoder (VAE), wherein the training of the neural network further includes:
retrieving a subset of the dataset as selected data,
applying the VAE to encode the selected data and learn a latent distribution of the selected data,
sampling the latent distribution to obtain a hidden representation of the selected data, wherein the hidden representation is used to determine a label for the selected data, and
encoding the hidden representation by a conditional VAE to obtain a mean and variation of a new hidden representation; and
an executable portion that estimates a label corruption probability of noisy labels for selected data from the dataset using temporal inconsistency in a machine model prediction during the training, wherein an embedding of the learned latent feature representation is applied as input to a semi-supervised training operation by the conditional VAE to perform the training of a classifier.

14. The computer program product of claim 13, wherein the semi-supervised training operation assumes a categorical label corruption rate for the selected data; and further including an executable portion that:
learns the label corruption probability of the noisy labels for the selected data from the dataset using a machine learning operation, wherein the dataset is a labeled dataset, an unlabeled dataset, a mislabeled dataset, or combination thereof.

15. The computer program product of claim 13, further including an executable portion that predicts the label corruption probability according to a difference between a moving average model and a machine learning model to modulate a labeled classification loss for processing the dataset having the noisy labels.

16. The computer program product of claim 13, further including an executable portion that applies the label corruption probability into the classifier to reduce a negative impact of mislabeled data in the sample dataset.

17. The computer program product of claim 13, further including an executable portion that use the label corruption probability of the noisy labels to assign one or more weights to the selected data.

* * * * *